United States Patent [19]

Tanaka

[11] Patent Number: 4,799,803
[45] Date of Patent: Jan. 24, 1989

[54] BALL SPLINE LINEAR MOTION ROLLING GUIDE UNIT

[75] Inventor: Kazuhiko Tanaka, Fuchu, Japan

[73] Assignee: Nippon Thompson Co., Ltd., Tokyo, Japan

[21] Appl. No.: 191,915

[22] Filed: May 9, 1988

[30] Foreign Application Priority Data

Sep. 16, 1987 [JP] Japan .................................. 62-231514

[51] Int. Cl.$^4$ ............................................. F16C 29/06
[52] U.S. Cl. .......................................... 384/43; 384/49
[58] Field of Search ................... 384/43, 45, 49, 451, 384/490, 492; 464/168

[56] References Cited

U.S. PATENT DOCUMENTS

| 253,679 | 2/1882 | Büssing | 384/451 |
| 4,312,545 | 1/1982 | Blaurock et al. | 384/43 |
| 4,629,337 | 12/1986 | Teramachi | 384/43 |

FOREIGN PATENT DOCUMENTS 0125573 11/1931 Austria .................................. 384/43

*Primary Examiner*—Thomas R. Hannon
*Attorney, Agent, or Firm*—Rogers & Killeen

[57] ABSTRACT

A ball spline linear motion rolling guide unit comprises: a ball spline shaft on which first track grooves are formed in a longitudinal direction at predetermined positions on an outer peripheral surface; a hollow outer cylinder having a hollow hole into which the ball spline shaft is slidably inserted; second track grooves formed on an inner peripheral surface of the hollow hole so as to face the first track grooves of the ball spline shaft; and balls inserted between the first and second track grooves, wherein the arc center of the second track groove formed on the outer cylinder is slightly deviated to the side of the ball spline shaft from the center of the ball inserted between the first and second track grooves, the entrance portion of the second track groove is formed by an arc surface having a diameter which is slightly larger than the diameter of the ball, thereby constructing a supporting portion of the balls, and an almost V-shaped notched groove is formed in a bottom portion of each of the first and second track grooves, thereby forming a groove having an almost arrowhead-shaped cross section, and the portion near the edge of the arrowhead-shaped groove serves as the track surface. With this structure, the small and cheap ball spline linear motion rolling guide unit can be manufactured.

3 Claims, 3 Drawing Sheets

BALL SPLINE LINEAR MOTION ROLLING GUIDE UNIT

BACKGROUND OF THE INVENTION

1. Field of the Invention

The present invention relates to a ball spline linear motion rolling guide unit for rectilinearly moving an outer cylinder member along a ball spline shaft and, more particularly, to a small ball spline linear motion rolling guide unit whose outer cylinder can be put in the palm of the hand.

2. Description of the Prior Art

Most of such a kind of small ball spline linear motion rolling guide units have three or more ball tracks and have the performances of heavy load and high rigidity. However, since they are generally used under the conditions of light load and high rectilinear moving accuracy, the specifications of the linear motion rolling guide unit and the use conditions do not properly coincide.

On the other hand, since such a kind of ball spline linear motion rolling guide unit has a holding apparatus, the number of parts is large. The supporting apparatus comes into contact with the balls during the sliding motion or the like, so that the running performance is adversely influenced. Also, this unit is expensive.

Further, since this linear motion rolling guide unit is small and has many ball tracks, the movement of the balls from the track surface to the direction turning passage is suddenly performed. Thus, there are problems such that the motion of the balls becomes unnatural and the smooth operation of the linear motion rolling guide unit is obstructed.

SUMMARY OF THE INVENTION

It is an object of the present invention to provide a cheap ball spline linear motion rolling guide unit having a simple structure and a high rectilinear motion accuracy which can solve the foregoing drawbacks in the conventional small ball spline linear motion rolling guide unit.

According to one aspect of the present invention, this object is accomplished by a ball spline linear motion rolling guide unit comprises:

a ball spline shaft on which first track grooves are formed in a longitudinal direction at predetermined positions on an outer peripheral surface; a hollow outer cylinder having a hollow hole into which the ball spline shaft is slidably inserted; second track grooves formed on an inner peripheral surface of the hollow hole so as to face the first track grooves of the ball spline shaft; and balls inserted between the first and second track grooves, wherein the arc center of the second track groove formed on the outer cylinder is slightly deviated to the side of the ball spline shaft from the center of the ball inserted between the first and second track grooves, the entrance portion of the second track groove is formed by an arc surface having a diameter which is slightly larger than the diameter of the ball, thereby constructing a supporting portion of the balls, and an almost V-shaped notched groove is formed in a bottom portion of each of the first and second track grooves, thereby forming a groove having an almost arrowhead-shaped cross section, and the portion near the edge of the arrowhead-shaped groove serves as the track surface. With this structure, the small and cheap ball spline linear motion rolling guide unit can be manufactured.

According to another aspect of the invention, the track groove of the ball spline shaft is formed by a Gothic arch groove, and two ball tracks are formed.

According to further another aspect of the invention, a return hole is formed in the outer cylinder, spacer rings formed with inside wall surfaces of a direction turning passage to communicate the return hole and the track groove are fixed to both ends in the longitudinal direction of the outer cylinder, side plates formed with scooping portions to scoop the balls and outside wall surfaces of the direction turning passage are fixed to the outside of the spacer rings, thereby forming an endless circulating passage for the balls.

With the foregoing structure of the present invention, the following advantages are derived.

(1) The cheap ball spline linear motion rolling guide unit without a supporting apparatus can be easily manufactured.

(2) The small-sized ball spline linear motion rolling guide unit can be made.

(3) The balls can be smoothly endlessly circulated and the slide resistance of the linear motion rolling guide unit is small.

(4) The number of parts can be reduced.

The above and other objects and features of the present invention will become apparent from the following detailed description and the appended claims with reference to the accompanying drawings.

BRIEF DESCRIPTION OF THE DRAWINGS

FIGS. 1 to 5B show an embodiment of the present invention, in which:

FIG. 1 is a perspective view;

FIG. 2 is a cross section of FIG. 1 taken on the spacer ring;

FIG. 3 is a perspective view showing a spacer ring in the invention;

FIG. 4 is an enlarged diagram showing a track groove portion in the invention;

FIG. 5B is an enlarged diagram of a main part in FIG. 5A.

DESCRIPTION OF THE PREFERRED EMBODIMENT

An embodiment of the present invention will be described in detail hereinbelow with reference to the drawings.

Figure 1:
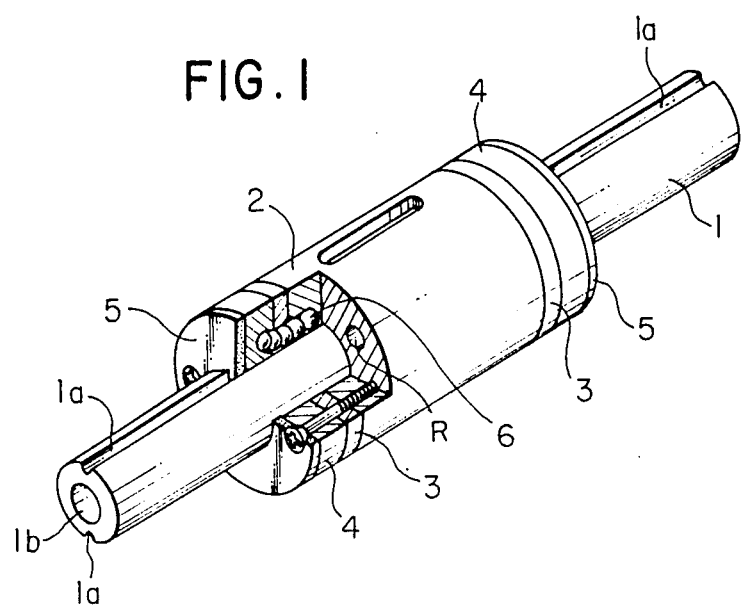

FIG. 1 is a perspective view showing an embodiment of the invention with a part of an outer cylinder member cut away for convenience of explanation.

Figure 2:
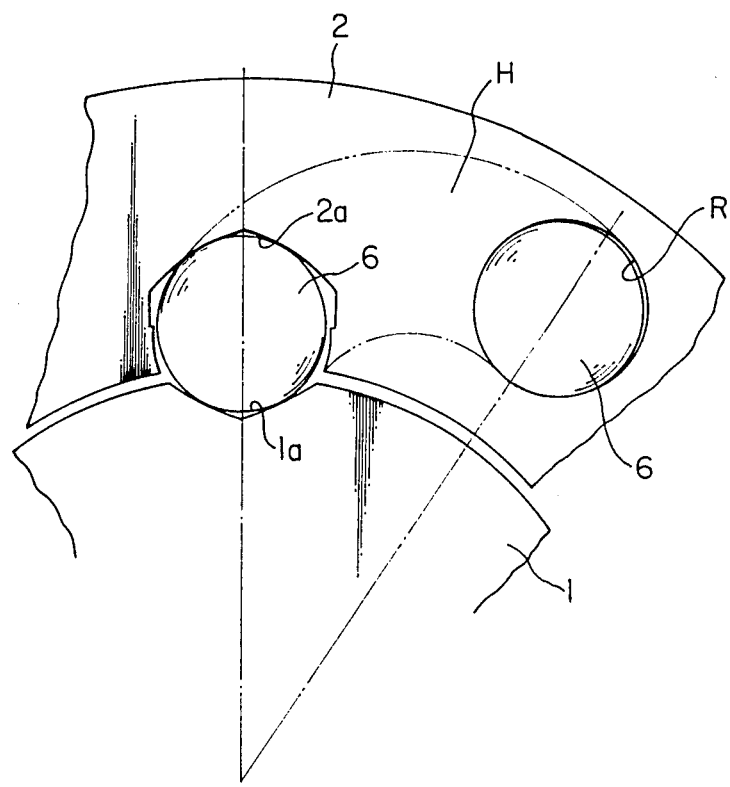

In FIG. 1, a ball spline linear motion rolling guide unit in this embodiment comprises a ball spline shaft 1 and an outer cylinder 2. The ball spline shaft 1 has therein a through hole 1b. A pair of track grooves 1a are formed in the outer peripheral surface in the longitudinal direction parallel with the through hole 1b at the opposite positions which are symmetrical with respect to the center of the shaft. The outer cylinder 2 has a hollow cylindrical shape having a hollow hole into which the ball spline shaft 1 is slidably inserted. As shown in FIG. 2, track grooves 2a are formed in the inner peripheral surface of the hollow hole of the outer cylinder 2 at the positions so as to face the track grooves 1a of the ball spline shaft 1. Endless circulating passages of balls are also formed in the outer cylinder 2. A number of balls 6 are inserted between the track grooves 1a and 2a. Thus, the outer cylinder 2 rectilinearly moves in the longitudinal direction of the ball spline shaft 1.

Reference numeral 3 denotes a spacer ring to smoothly lead the balls to a direction turning passage and to turn the moving direction of the balls; 4 indicates a side plate which mainly forms an outside wall surface of the direction turning passage; and 5 represents a sealing member.

FIG. 2 is an enlarged cross section of FIG. 1, taken on the spacer ring. The balls 6 are inserted between the track groove 1a formed on the ball spline shaft 1 and the track groove 2a formed on the inner peripheral surface of the hollow hole of the outer cylinder 2. Thus, the relative rolling motion can be performed for the spline shaft 1 of the outer cylinder 2.

An endless circulating passage is formed by a direction turning passage H and a return hole R which extends into the outer cylinder in parallel with the track grooves 1a and 2a which face each other. The balls 6 pass through the direction turning passage H and are circulated and moved in the endless circulating passage. The return hole R formed in the outer cylinder 2 in parallel with the track grooves can be formed at an arbitrary position in the outer cylinder 2.

The track groove 2a is formed such that the edge portion in the cross section is slightly narrower than a diameter of each ball. Therefore, the balls 6 can be held in the track groove 2a on the side of the outer cylinder 2 without separately attaching a supporting apparatus.

Figure 3:
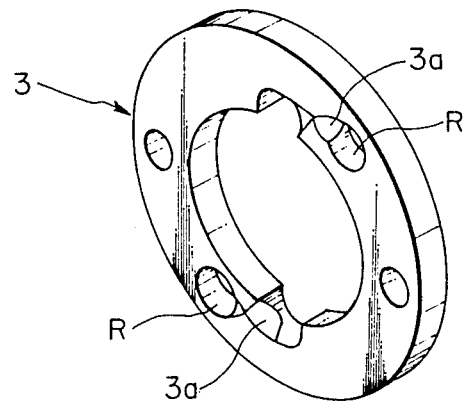

FIG. 3 is a perspective view of the spacer ring. The spacer ring 3 is fixed between the outer cylinder 2 and the side plate 4. All of the inside wall surfaces of the direction turning passage H are formed in the spacer ring 3 such that the balls 6 are smoothly scooped from the track groove to the direction turning passage H. Therefore, a radius of arc of the direction turning passage can be set to be large and the balls can be more smoothly moved. Reference numeral 3a denotes an inner wall surface of the spacer ring 3.

Figure 4:
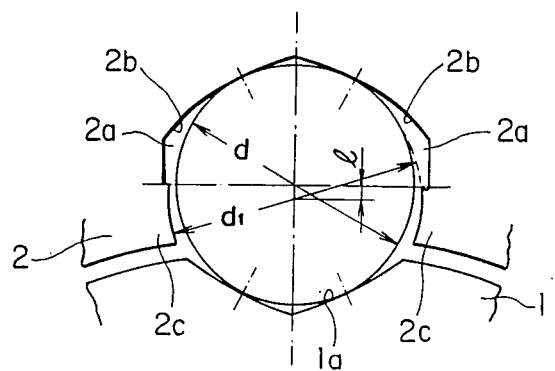

FIG. 4 illustrates relations regarding the shapes and positions among the track grooves 2a formed on the inner peripheral surface of the outer cylinder 2, the track grooves 1a formed on the ball spline shaft 1 at the positions corresponding to the track grooves 2a, and each ball 6 inserted between the track grooves 1a and 2a.

The track grooves 2a of the outer cylinder 2 are formed by the following method. As shown in FIG. 4, holes of a diameter $d_1$ are formed at two predetermined positions of the inner peripheral surface of the hollow hole of the raw material of the outer cylinder of the hollow cylinder by using a drill. The center of each hole is set to a position which is deviated from the final central position of the ball 6 to the side of the center of the ball spline shaft 1 by only a distance l in the cross section. Thus, each hole is formed so as to have the diameter $d_1$ which is slightly larger than the diameter d of the ball.

Next, the track groove 2a having a track surface 2b is formed on the inner peripheral surface of the hollow hole so as to be symmetrical with respect to a line passing through the final center of the ball 6 and the center of the ball spline shaft 1 as a symmetrical axis by a broaching work using a broach having substantially an arrow-shaped cross section. Further, the track surface 2b is finished by a honing work or the like. An almost V-shaped notched groove is formed in the bottom portion of the track groove 2a to obtain a groove having substantially an arrowhead-shaped cross section. The surface near the edge of the arrowhead-shaped portion is used as the track surface.

Thus, the portion excluding the finished portion of the hole of a diameter $d_1$ which was first formed constitutes a supporting portion 2c for the balls 6. Consequently, the outer cylinder 2 having no supporting apparatus can be easily cheaply manufactured.

Figure 5A:
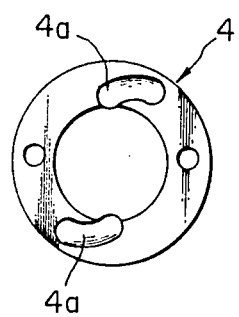
FIG. 5A is a front view of a side plate when it is seen from the side of an outer cylinder in the invention.
Figure 5B:
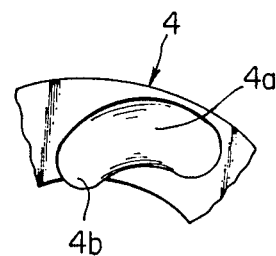

FIGS. 5A and 5B show the side plate 4, in which FIG. 5A is a front view when it is seen from the side of the outer cylinder 2. FIG. 5B is an enlarged diagram of a main part in FIG. 5A. The side plate 4 has two functions: the first function to smoothly scoop the balls 6 in the track grooves to the direction turning passage H by a scooping portion 4b formed so as to be projected at a position near the inner peripheral surface of the hollow hole of the outer cylinder 2; and the second function to smoothly lead the balls 6 to the return hole R by an outer peripheral surface 4a (concave portion) of the direction turning passage H formed.

As described above, according to the invention, there are provided track grooves suitable for use in a cheap ball spline linear motion rolling guide unit of a high accuracy to which no supporting apparatus is attached. These track grooves are not limited to the number and sizes of the ball tracks.

On the other hand, if the track grooves according to the invention are applied to the ball spline linear motion rolling guide unit having two ball tracks, the ball spline linear motion rolling guide unit of a smaller size and a higher performance can be manufactured. Further, by use of the spacer ring, the ball spline linear motion rolling guide unit having a smoother slide resistance can be realized.

The present invention is not limited to the foregoing embodiment but many modifications and variations are possible within the spirit and scope of the appended claims of the invention.

I claim:

1. A ball spline linear motion rolling guide unit comprising:
   a ball spline shaft (1) on which a plurality of first track grooves (1a) are formed in a longitudinal direction at predetermined positions on an outer peripheral surface;
   a hollow outer cylinder (2) having a hollow hole into which the ball spline shaft (1) is slidably inserted;
   a plurality of second track grooves (2a) formed on an inner peripheral surface of said hollow hole so as to face the first track grooves (1a) of the ball spline shaft (1); and
   a number of balls (6) which are inserted between the first and second track grooves (1a and 2a),
   wherein a center of an arc of each of the second track grooves (2a) formed on the outer cylinder (2) is slightly deviated to the side of the ball spline shaft (1) from a center of the ball (6) inserted between the first and second track grooves (1a and 2a), an entrance portion of the second track groove (2a) is formed by an arc surface having a diameter ($d_1$) which is slightly larger than a diameter (d) of the ball (6), thereby constructing a supporting portion (2c) of the balls (6), and an almost V-shaped notched groove is formed in a bottom portion of each of the first and second track grooves (1a and 2a), thereby forming a groove having an almost arrowhead-shaped cross section, and the portion near the edge of said arrowhead-shaped grooves serves as the track surface (2b).

2. A ball spline linear motion rolling guide unit according to claim 1, wherein the track groove (1a) of the ball spline shaft (1) is formed by a Gothic arch groove, and two ball tracks are formed.

3. A ball spline linear motion rolling guiding unit according to claim 2, wherein a return hole (R) is formed in the outer cylinder (2), spacer rings (3) formed with inside wall surfaces of a direction turning passage (H) to communicate the return hole (R) and the track groove (2a) are fixed to both ends in the longitudinal direction of the outer cylinder (2), side plates (4) formed with scooping portions (4b) to scoop the balls (6) and outside wall surfaces of the direction turning passage (H) are fixed to the outside of the spacer rings (3), thereby forming an endless circulating passage for the balls (6).

* * * * *